(12) United States Patent
Aßmann et al.

(10) Patent No.: US 11,721,031 B2
(45) Date of Patent: Aug. 8, 2023

(54) SCALABLE DEPTH SENSOR

(71) Applicant: STMicroelectronics (Research & Development) Limited, Marlow (GB)

(72) Inventors: Andreas Aßmann, Edinburgh (GB); Brian Douglas Stewart, Edinburgh (GB)

(73) Assignee: STMicroelectronics (Research & Development) Limited, Marlow (GB)

( * ) Notice: Subject to any disclaimer, the term of this patent is extended or adjusted under 35 U.S.C. 154(b) by 184 days.

(21) Appl. No.: 17/083,079

(22) Filed: Oct. 28, 2020

(65) Prior Publication Data
US 2022/0130060 A1  Apr. 28, 2022

(51) Int. Cl.
*G06K 9/00* (2022.01)
*G06T 7/50* (2017.01)
*G01S 7/483* (2006.01)
*G01S 17/894* (2020.01)

(52) U.S. Cl.
CPC .............. *G06T 7/50* (2017.01); *G01S 7/483* (2013.01); *G01S 17/894* (2020.01); *G06T 2207/10028* (2013.01)

(58) Field of Classification Search
CPC ................... G06T 7/50; G06T 2207/10028
See application file for complete search history.

(56) References Cited

U.S. PATENT DOCUMENTS

| | | | | |
|---|---|---|---|---|
| 7,262,402 B2 * | 8/2007 | Niclass | ................. | H01L 31/107 250/214 R |
| 9,213,916 B2 * | 12/2015 | Gardiner | ................ | G06V 10/20 |
| 9,615,024 B1 * | 4/2017 | Gonzalez | ............ | H03M 7/3062 |
| 10,198,790 B1 * | 2/2019 | Owechko | .............. | H04N 5/2621 |
| 10,607,352 B2 * | 3/2020 | Ortiz Egea | ............ | H04N 23/65 |
| 10,638,038 B2 * | 4/2020 | Downing | ............... | H04N 23/71 |
| 11,563,911 B2 * | 1/2023 | Li | ........................ | H04N 25/705 |

(Continued)

FOREIGN PATENT DOCUMENTS

| | | | | |
|---|---|---|---|---|
| EP | 3480626 A1 * | 5/2019 | ............. | G01S 17/36 |
| EP | 3705913 A1 * | 9/2020 | ............. | G01S 17/10 |

(Continued)

OTHER PUBLICATIONS

Hybrid Structured Light for Scalable Depth Sensing, Yueyi Zhang et al., IEEE, 978-1-4673-2533-2, 2012, pp. 17-20 (Year: 2012).*

(Continued)

*Primary Examiner* — Jayesh A Patel
(74) *Attorney, Agent, or Firm* — Slater Matsil, LLP

(57) ABSTRACT

A system and method for a scalable depth sensor. The scalable depth sensor having an emitter, a receiver, and a processor. The emitter is configured to uniformly illuminate a scene within a field-of-view of the emitter. The receiver including a plurality of detectors, each detector configured to capture depth and intensity information corresponding to a subset of the field-of-view. The a processor connected to the detector and configured to selectively sample a subset of the plurality of the detectors in accordance with compressive sensing techniques, and provide an image in accordance with an output from the subset of the plurality of the detectors, the image providing a depth and intensity image corresponding to the field-of-view of the emitter.

26 Claims, 6 Drawing Sheets

(56) References Cited

U.S. PATENT DOCUMENTS

| | | | |
|---|---|---|---|
| 2013/0088726 A1* | 4/2013 | Goyal | G01S 17/10 356/634 |
| 2013/0228692 A1* | 9/2013 | Larsen | G01J 5/0018 250/342 |
| 2013/0237811 A1* | 9/2013 | Mihailescu | A61B 34/20 600/407 |
| 2014/0253688 A1* | 9/2014 | Metz | G01B 11/026 348/46 |
| 2015/0042764 A1* | 2/2015 | Xi | H04N 13/243 348/47 |
| 2016/0146595 A1* | 5/2016 | Boufounos | G01S 17/10 348/47 |
| 2016/0216372 A1* | 7/2016 | Liu | G01S 13/904 |
| 2017/0132804 A1* | 5/2017 | Brady | G06T 5/50 |
| 2017/0139040 A1* | 5/2017 | Mellot | G01S 7/4915 |
| 2017/0180639 A1* | 6/2017 | Kamilov | G01S 17/08 |
| 2017/0214890 A1* | 7/2017 | Tadano | H01L 27/14621 |
| 2017/0357000 A1* | 12/2017 | Bartlett | G01S 7/4816 |
| 2018/0059224 A1* | 3/2018 | Wang | G01S 17/10 |
| 2018/0100926 A1* | 4/2018 | Boufounos | G01S 7/4802 |
| 2018/0115766 A1* | 4/2018 | Yuan | H04N 5/2226 |
| 2018/0260649 A1* | 9/2018 | Kadambe | G02B 26/0833 |
| 2019/0037136 A1* | 1/2019 | Downing | H04N 23/743 |
| 2019/0041502 A1* | 2/2019 | Onal | G01J 1/44 |
| 2020/0057151 A1* | 2/2020 | Finkelstein | G01S 7/4815 |
| 2020/0142069 A1* | 5/2020 | Onal | G01S 7/4865 |
| 2020/0404246 A1* | 12/2020 | Beshinski | H04N 25/46 |
| 2021/0124235 A1* | 4/2021 | Sickler | G02F 1/295 |
| 2021/0385424 A1* | 12/2021 | Assmann | H04N 13/239 |

FOREIGN PATENT DOCUMENTS

| | | | | |
|---|---|---|---|---|
| GB | 2486455 A | * | 6/2012 | G04F 10/005 |
| JP | 2018511796 A | * | 4/2018 | |
| WO | WO-2005072358 A2 | * | 8/2005 | G01C 3/08 |
| WO | WO-2015199736 A1 | * | 12/2015 | G01S 17/02 |
| WO | WO-2018075252 A1 | * | 4/2018 | G03B 15/05 |
| WO | WO-2019215172 A1 | * | 11/2019 | G01B 11/22 |
| WO | WO-2020115017 A1 | * | 6/2020 | G01S 17/894 |
| WO | WO-2020142675 A1 | * | 7/2020 | G01S 17/42 |

OTHER PUBLICATIONS

Compressive Super-Pixel LiDAR for High-Framerate 3D Depth Imaging, Andreas ABmann et al, IEEE, 978-1-7281-2723-1, 2019, pp. 1-5 (Year: 2019).*

Long-range depth imaging—data fusion, Susan Chan et al., Scientific Reports, 2019, pp. 1-10 (Year: 2019).*

Low-Cost Compressive Sensing for Color Video and Depth, Xin Yuan et al, arXiv, Feb. 2014, pp. 1-8 (Year: 2014).*

Multi-Objective Optimizing for Image Recovering in Compressive Sensing, Sheng Bi et al., IEEE, 2012, pp. 2242-2247 (Year: 2012).*

Compressive Sensing: From Theory to Applications, a Survey, Saad Qaisar et al., IEEE, 2013, pp. 453-456 (Year: 2013).*

Aßmann, Andreas et al., "Accelerated 3D Image Reconstruction for Resource Constrained Systems," EUSIPCO 2020, Jun. 2020, 5 pages.

Aßmann, Andreas et al., "Compressive Super-Pixel LiDAR for High Framerate 3D Depth Imaging," in IEEE Global Conference on Signal and Information Processing (GlobalSIP), Ottawa, Canada, 2019, 5 pages.

Candes, Emmanuel J., et al., "Near-Optimal Signal Recovery from Random Projections: Universal Encoding Strategies?" IEEE Transactions on Information Theory, vol. 52, No. 12, Dec. 2006, 20 pages.

Candes, Emmanuel, et al., "An Introduction to Compressive Sampling," IEEE Signal Processing Magazine, Mar. 2008, 10 pages.

Duarte, Marco F., et al., "Single-Pixel Imaging via Compressive Sampling," IEEE Signal Processing Magazine, Mar. 2008, 9 pages.

* cited by examiner

SCALABLE DEPTH SENSOR

TECHNICAL FIELD

The present disclosure generally relates to an imaging system and, in particular embodiments, to systems and methods for depth image sensors.

BACKGROUND

Light detection and ranging (LiDAR) is an active sensing scheme used to measure distances by illuminating a target using a laser and measuring the reflection with a detector. Generally, in a direct time-of-flight (ToF) system, the laser emitter is synchronized with the detector to provide the time-of-flight measurements per the emission-detection intervals. The time-of-flight measurements are translated to distance using the speed of light as a universal constant.

Increasingly, advanced tasks are envisioned for autonomous systems, augmented and virtual reality, and computational photography, and, thus, accurate and high-resolution depth perception becomes a key component of system design. In mobile applications, space and cost are at a prohibitive premium, and yielding a more significant performance to area ratio is desirable.

Existing high-resolution time-of-flight imagers are typically large and consume a substantial amount of power. Generally, these devices include a large laser array and/or a single-photon avalanche diode (SPAD) pixel array. In addition to the complex optical requirements, existing imagers produce a large volume of data to derive an image with depth sensing. Further, the increase in image resolution generates an increase in data bandwidth, which presents additional challenges. In precise depth measurements, the data bandwidth challenge is readily apparent as the histogram scales with maximum range, depth precision, and pixel array size (i.e., image resolution). The complex optics and large data volumes are detrimental in mobile applications, given the significant size and associated power constraints.

The various constraints within conventional imaging systems present significant challenges to the processing stack and often necessitate considerable power resources and expensive solutions regarding hardware and system requirements. Systems usually require a complex system-on-chip (SoC) that includes a graphics processing unit (GPU), a central processing unit (CPU), and various accelerator solutions (or combination of each component) to perform real-time calculations and operation. Efficient and robust systems and methods for three-dimensional time-of-flight depth imaging are desirable.

SUMMARY

A first aspect relates to a method of operating a scalable depth sensor, the method including uniformly illuminating a scene within a field-of-view of an emitter. The method further includes having a receiver that includes a plurality of detectors, and selectively sampling a subset of the plurality of detectors in accordance with compressive sensing techniques, capturing depth and intensity measurements by each of the subset of the plurality of detectors, each detector capturing depth and intensity information corresponding to a subset of the field-of-view, and generating, by a processor, images of the scene in accordance with an output from the subset of the plurality of the detectors, the images providing a depth and intensity image corresponding to the field-of-view of the emitter.

In the first implementation form of the method according to the first aspect, the emitter includes a single light source.

In a second implementation form of the method, according to the first aspect as such or any preceding implementation of the first aspect, the emitter includes a coherent light source that includes a plurality of light sources, the plurality of light sources providing a single uniform illumination of the scene.

In a third implementation form of the method, according to the first aspect as such or any preceding implementation of the first aspect, the method further includes communicating, by each of the subset of the plurality of detectors, a respective depth and intensity measurement to the processor.

In a fourth implementation form of the method, according to the first aspect as such or any preceding implementation of the first aspect, the receiver is an array, which includes a plurality of single-photon avalanche diode (SPAD) devices, where each SPAD device corresponds to a detector in the plurality of detectors.

In a fifth implementation form of the method, according to the first aspect as such or any preceding implementation of the first aspect, the method further includes emitting a signal to illuminate the scene; and measuring, each of the subset of the plurality of detectors, a time-of-flight (ToF) of the signal within a respective subset of a field-of-view of each detector, the measurement synchronized in accordance to a timing reference corresponding to the emission of the signal.

In a sixth implementation form of the method, according to the first aspect as such or any preceding implementation of the first aspect, the capturing the depth and the intensity measurements by each of the subset of the plurality of detectors includes reconstructing the depth and intensity image within the subset of the field-of-view.

In a seventh implementation form of the method, according to the first aspect as such or any preceding implementation of the first aspect, the method further includes providing an output of the reconstructed depth and intensity measurements within the subset of the field-of-view to the processor.

In an eight implementation form of the method, according to the first aspect as such or any preceding implementation of the first aspect, the selectively sampling the subset of the plurality of detectors in accordance with compressive sensing techniques includes selectively toggling each of the subset of the plurality of detectors in accordance with a pattern that changes at predefined time intervals.

A second aspect relates to a device, which includes an emitter, a receiver, and a processor. The emitter is configured to uniformly illuminate a scene within a field-of-view of the emitter. The receiver includes a plurality of detectors, each detector configured to capture depth and intensity information corresponding to a subset of the field-of-view. The processor is connected to the detector, the processor configured to selectively sample a subset of the plurality of the detectors in accordance with compressive sensing techniques, and provide an image in accordance with an output from the subset of the plurality of the detectors, the image providing a depth and intensity image corresponding to the field-of-view of the emitter.

In a first implementation form of the device according to the second aspect as such, the device further includes a plurality of communication links, each communication link coupling a respective detector to the processor.

In a second implementation form of the device, according to the second aspect as such or any preceding implementation of the second aspect, the receiver is an array, which includes a plurality of single-photon avalanche diode (SPAD) devices, where each SPAD device corresponds to a detector in the plurality of detectors.

In a third implementation form of the device, according to the second aspect as such or any preceding implementation of the second aspect, the emitter is configured to emit a signal to illuminate the scene, where each detector is configured to measure a time-of-flight (ToF) of the signal within a respective subset of the field-of-view of the detector, the measurement synchronized in accordance to a timing reference corresponding to the emission of the signal.

In a fourth implementation form of the device, according to the second aspect as such or any preceding implementation of the second aspect, each detector is configured to capture the depth and intensity information corresponding to a subset of the field-of-view includes reconstructing the depth and intensity image within the subset of the field-of-view.

In a fifth implementation form of the device, according to the second aspect as such or any preceding implementation of the second aspect, each receiver is further configured to output the reconstructed depth and intensity image within the subset of the field-of-view to the processor.

In a sixth implementation form of the device, according to the second aspect as such or any preceding implementation of the second aspect, the selectively sampling the subset of the plurality of detectors in accordance with compressive sensing techniques includes selectively toggling the subset of the plurality of the detectors in accordance with a pattern that changes at predefined time intervals.

In a seventh implementation form of the device, according to the second aspect as such or any preceding implementation of the second aspect, the emitter includes a single light source.

In an eight implementation form of the device, according to the second aspect as such or any preceding implementation of the second aspect, the emitter includes a coherent light source, which includes a plurality of light sources, the plurality of light sources providing a single uniform illumination of the scene.

A third aspect relates to a system that includes an emitter and an imager. The emitter is configured to uniformly illuminate a scene within a field-of-view of the emitter. The imager includes a plurality of receivers, a plurality of processors, and a memory. Each receiver includes a plurality of detectors, each detector configured to capture depth and intensity information corresponding to a subset of the field-of-view based on a reflection from the single light source. Each processor is connected to a respective receiver, and each processor configured to selectively sample a subset of the plurality of the detectors in accordance with compressive sensing techniques; and provide a corresponding image in accordance with an output from the subset of the plurality of the detectors, the image providing a depth and intensity image corresponding to the field-of-view of the emitter. The memory is connected to the processor, and the memory is used to store each of the images in accordance with a configuration of each respective receiver, the plurality of images providing a final full image corresponding to an image of the scene.

In a first implementation form of the system according to the third aspect, each imager includes a plurality of communication links, each communication link coupling a respective detector to a corresponding processor.

In a second implementation form of the system, according to the third aspect as such or any preceding implementation of the third aspect, each receiver is an array, which includes a plurality of single-photon avalanche diode (SPAD) devices, where each SPAD device corresponds to a respective detector in a plurality of detectors.

In a third implementation form of the system, according to the third aspect as such or any preceding implementation of the third aspect, the emitter is configured to emit a signal to illuminate the scene. Each detector is configured to measure a time-of-flight (ToF) of the signal within a respective subset of the field-of-view of the detector, the measurement synchronized in accordance to a timing reference corresponding to the emission of the signal.

In a fourth implementation form of the system, according to the third aspect as such or any preceding implementation of the third aspect, each detector is configured to capture a depth and intensity image corresponding to a subset of the field-of-view, which includes reconstructing the depth and intensity image within the subset of the field-of-view.

In a fifth implementation form of the system, according to the third aspect as such or any preceding implementation of the third aspect, selectively sampling the subset of the plurality of detectors in accordance with compressive sensing techniques includes selectively toggling the subset of the plurality of the detectors in accordance with a pattern that changes at predefined time intervals.

In a sixth implementation form of the system, according to the third aspect as such or any preceding implementation of the third aspect, the emitter includes a single light source.

In a seventh implementation form of the system, according to the third aspect as such or any preceding implementation of the third aspect, the emitter includes a coherent light source, which includes a plurality of light sources, the plurality of light sources providing a single uniform illumination of the scene.

Embodiments can be implemented in hardware, software, or in any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
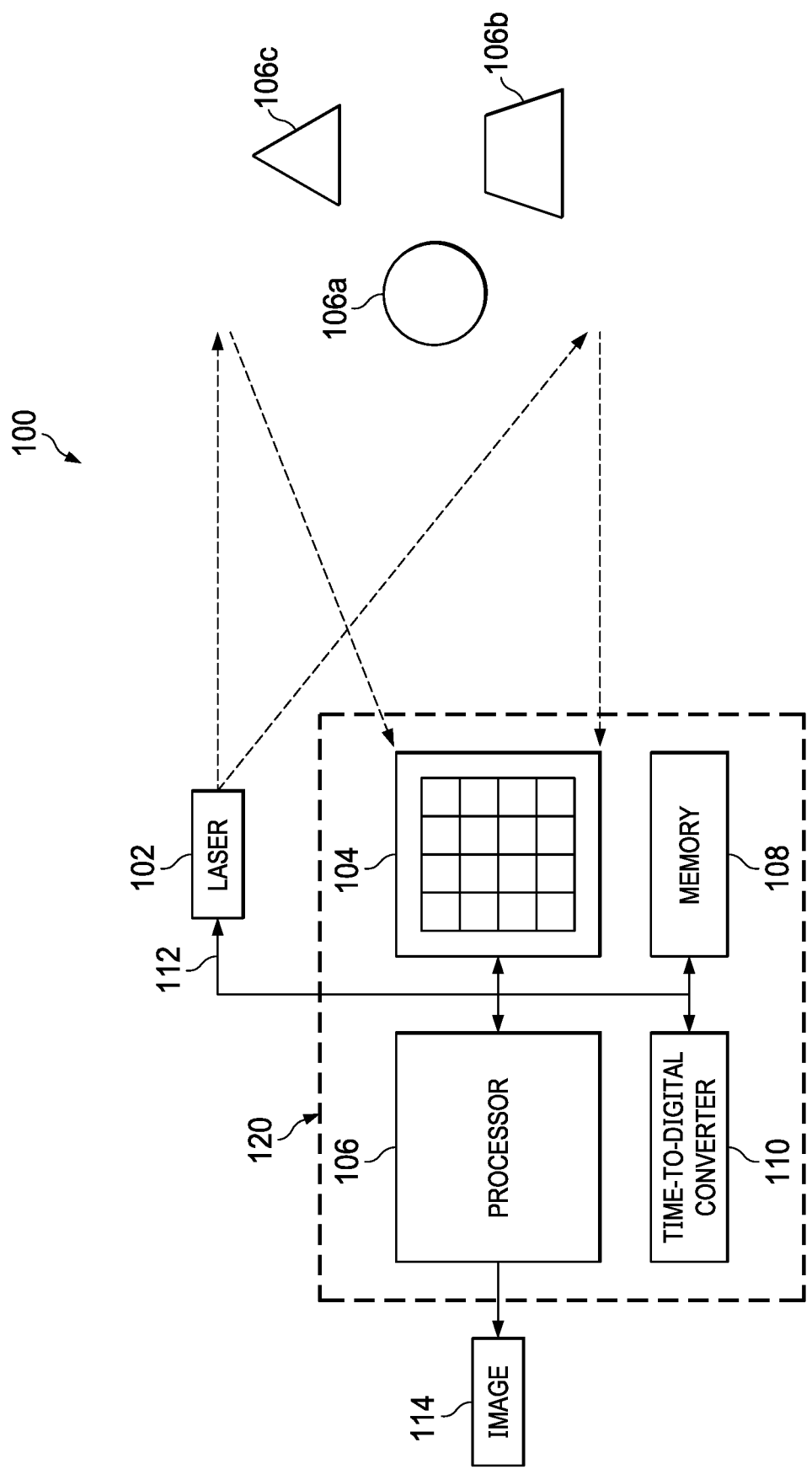
FIG. 1 is a block diagram of an embodiment imaging system.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise.

Variations or modifications described to one of the embodiments may also apply to other embodiments. Further, it should be understood that various changes, substitutions, and alterations can be made herein without departing from the spirit and scope of this disclosure as defined by the appended claims.

Solid-state light detection and ranging (LiDAR) arrays enable robust and small-scale depth sensing. An increase in resolution, however, leads to an increase in array size and, critically, to the rise in the requisite sampling data. Raw waveform processing per pixel is computationally expensive and requires a large amount of storage memory. Compressive sensing (CS) techniques combine sampling and compression into a single non-adaptive (i.e., incoherent with respect to reconstruction basis) linear measurement process (i.e., measurements from random linear combinations and allows for significant system efficiencies at the sampling stage).

Compressive sensing allows for image reconstruction based on a small collection of non-adaptive linear measurements of a compressible signal or image. Compressive sensing exploits the fact that many natural signals are sparse or compressible because they have concise representation when expressed in a proper basis. Typical data acquisition methods use many sensors to collect a large amount of data, followed by compression, discarding of unused data, and an expensive de-compression stage to retrieve useful information. In contrast, compressive sensing relies on a fewer number of sensors to capture fewer incoherent measurements and only capturing the significant components required for image reconstruction.

Most natural signals ($x \in R^n$) are compressive or sparse in some basis via linear transformation $\theta$. In other words, many components of $y=\theta x$ are approximately zero, with few non-zero features. Compressive sensing provides a technique to directly sample the significant components with means of a projection $\varphi$. This technique allows for sparse sampling of the signal while having a structured fashion.

In reconstructing the signal, the $\delta_1$ norm is minimized for a specific basis function to match the sparsity constraint of the signal in the reconstruction process. The reconstruction is often formulated as an optimization problem in the form of:

$$\min_x g(\theta x)$$

$$s.t.\ Ax=y,$$

Where $A=\varnothing \theta$, and is often called the sensing matrix. When total variation is used as a penalty function, $\theta=\text{diag}(1)^n$. Otherwise, $\theta$ is a linear basis transform such as a discrete cosine transform (DCT) or a wavelet transform.

Gaussian random binary patterns can approximate most basis functions and are, therefore, a practical way of obtaining compressive sensing samples with spatial light modulation. The spatial light modulation is often achieved with expensive and complicated devices such as a digital micromirror device (DMD), which allows the modulation of light using microelectromechanical system (MEMS) mirrors. When light is steered away from the field-of-view (FoV), the state of the system is at "0," and when the light is fully transmitting, the state of the system is at "1."

Digital micro-mirror devices are typically inefficient, and costly. Further, due to the complicated optics, they are not suitable for compressive sensing imagers due to inherent inefficiencies. An alternative to the digital micro-mirror device is a programmable solid-state laser array, which is more space-efficient and does not suffer from the same optical loss due to light being spatially modulated at emission. However, as the size of the image increase, so does the size of the laser array and, consequently, the amount of power draw of the system.

Compressive sensing may be applied to LiDAR applications, which exploits parallelism in a large scale photon detector array to accelerate depth computation while retaining the reduction in the sampling bandwidth. This approach, however, typically requires an elaborate emitter scheme, which provides structured illumination using Gaussian random binary patterns and a parallel system-on-chip (SoC) to facilitate the compressive sensing framework and to accelerate reconstruction.

Embodiments of this disclosure provide an imaging system that includes a receiver having a scalable array of receiver blocks, which are equally applicable to long-range and short-range LiDAR applications. The imaging system consists of a single emitter (i.e., simple optics) that uniformly illuminates a scene. The receiver block includes a plurality of detectors, each receiver block capable of measuring a time-of-flight depth and intensity image of the scene. A processor selectively toggles a subset of the detectors within the receiver block based on compressive sensing techniques, with two measurements per sparse pattern. A final image is reconstructed based on the data collected by the subset of the detectors. The block-based sensing allows for design flexibility and scalability in resolution and system footprint.

The resulting data collected by the subset of detectors provides a compact set of measurement vectors. In embodiments, the processor is connected to each receiver block. The processor provides an integrated solution that allows a resource-efficient control and computation process within the imaging system. Each receiver block is an independent imager covering a specific subset of the scene. The small block size enables the minimization of logic via one or more discrete and approximate computations. The framerate remains constant when scaled up to higher resolutions due to the framerate being defined at the block level. A receiver block may also be referred to as a compressive imaging block, block imager, or sparse sensing block.

Non-limiting applications corresponding to the embodiments in this disclosure are augmented reality, virtual reality, autonomous robotics, gesture recognition, face recognition, monitoring in-cabin, and monitoring presence applications. It is noted that the principles disclosed may be applied to standard RGB, RGBZ, monocular (Mono), and monocular depth (MonoZ) imagers to reduce data bandwidth and processing costs.

In an embodiment, a sampling technique at the detector array side (receiver side) utilizes compressive sensing without structured illumination. In another embodiment, each block has a dedicated light source. Such an embodiment allows for long-range applications where uniform flash illumination may not be permissible due to power and safety constraints. In both cases, the structure of the light emitter is advantageously simplified to a single uniform coherent light source for the entirety of the compressive imaging blocks.

The array of compressive imaging blocks capture large resolutions and field-of-views with framerates set by the framerate associated with a single compressive imaging block—in contrast to being set by the full image array size in conventional imaging systems.

The resulting imaging system allows for faster sampling and frame-rates without rolling shutter effects affecting conventional large scale arrays. Thus, embodiments of this disclosure address the limitations in traditional systems by eliminating the communication overhead resulting from, for example, software-defined parallel processing schemes. Generally, any scheduled parallelism adds overhead in both hardware and software-defined parallel processing schemes. Embodiments of this disclosure provide scheduled parallelism, by a time-of-flight circuit, without the associated overhead.

Aspects of this disclosure combine small scale solid-state arrays with compressive sensing techniques at the receiver side to enable discrete integrated computational imaging blocks. Moreover, due to the computation's integrated nature, the need for expensive intermediate data storage is minimized.

In an embodiment, the imaging system uses a single uniform illumination source and independent sensing blocks for scalability. In another embodiment, each block has a dedicated light source (i.e., per block illumination) to provide uniform illumination for each block's field-of-view.

In embodiments, the sensing blocks use compressive sensing techniques to sparsely sample and discretely compute depth or measure distance. Advantageously, such embodiments provide an efficient system concerning space, cost, data bandwidth, and power budget requirements.

In embodiments, each sensing block within the imaging system includes an efficiently integrated processor capable of depth and intensity computation logic integrated into one block sensor stack. A plurality of the sensing blocks can then be scaled up to provide for larger photon imaging and depth imaging arrays. In such embodiments, the system performance is associated with the block rather than the larger array. These and other details are discussed in greater detail below.

FIG. 1 illustrates a block diagram of an embodiment imaging system 100, which may be installed in a host device. As shown, the imaging system 100 includes an emitter 102 and a block imager 120. The block imager 120 includes a receiver block 104, a processor 106, a memory 108 (optional), a time-to-digital converter 110, and interface 112, which may (or may not) be arranged as shown in FIG. 1. The imaging system 100 provides a three-dimensional depth and intensity image corresponding to the field-of-view of the emitter 102. It is noted that the imaging system 100, and in particular the block imager 120, is self-contained in terms of compressive sensing.

The block imager 120 benefits from structured sparse sampling and exploits sparsity in the signals to reduce the total bandwidth. The block imager 120 divides the process of imaging into smaller pieces, minimizing data stored in the memory 108, increases processing speed at the processor 106, and reduces the illumination power at the emitter 102.

In embodiments, the emitter 102 is a single coherent light source configured to uniformly illuminate a scene within a field-of-view of the emitter 102. In some embodiments, the emitter 102 may be a vertical-cavity surface-emitting laser (VCSEL). In some embodiments, the emitter 102 may be a light-emitting-diode (LED), a vertical-cavity-surface-light-emitting (VCSEL) diode or another suitable coherent illuminator, compatible with time-of-flight principles to facilitate a flash illuminator used in, for example, short-range applications. In embodiments, the emitter 102 is a timed laser source synchronized using, for example, the processor 106 and the time-to-digital converter 110 to allow for time-of-flight measurements in the block imager 120. In embodiments, the emitter 102 may include a lens to cover a wider field-of-view than usually illuminated solely by the emitter 102.

As the emitter 102 illuminates the entire scene uniformly, and the sampled scene by the block imager 120 is defined by each pixel of the block imager 120, the imaging system 100 is not overly sensitive to optical alignment, in contrast to conventional imaging systems. Similar advantages are gained where emitter 102 illuminates a single block's field-of-view uniformly (i.e., flash illumination).

The receiver block 104 includes a plurality of detectors arranged, for example, in a matrix configuration. Each block receiver is configured to capture measurements for a depth and an intensity image corresponding to a subset of the field-of-view of the emitter 102—each detector being a photon sensitive element or plurality thereof (i.e. macropixel). In other words, the depth and intensity sensor provides a reconstructed depth and intensity image of the subset of the field-of-view (i.e., image block) associated with the respective block receiver. Each detector in the receiver block 104 operates independently of the other detectors and provides an output to the processor 106 via the interface 112.

In embodiments, the sparse sampling is controlled and/or coordinated between and among the plurality of the detectors in the block imager 120. It is noted that each detector can be addressed, controlled, and configured individually and independently of the other detectors within a receiver block 104.

In embodiments, the receiver block 104 is an array of single-photon avalanche diode (SPAD) devices (i.e., SPAD array). In such an embodiment, each SPAD device corresponds to one of the detectors in the receiver block 104.

The sparse sampling at the detector side advantageously allows for a significant reduction in interface 112, memory 108, and processor 106 requirements. The imaging system 100 provides for small scale local reconstruction of depth and intensity image without a typical compressive sensing structure at the emitter 102.

The receiver block 104 shown in FIG. 1 is a 4×4 array block. It should be understood that the embodiment shown is non-limiting, and the number of detector blocks may be scaled up or scaled down based on, for example, application or system efficiency regarding size, cost, or space of the imaging system 100, or a host device of the imaging system 100. Each detector in the receiver block 104 can be addressable on a pixel-by-pixel basis to sample the array block in accordance with a sampling pattern.

The time-to-digital converter 110 samples photon events with precise timing synchronized with the emitter 102; this allows quantization of photon events in range measurements. In normal time-of-flight systems, a time-to-digital converter 110 is required for every detector. However, in embodiments, the number of time-to-digital converter 110 per block is a single time-to-digital converter per block. When scaled up, the small number of time-to-digital converters 110 per resolution per unit provides efficiency in sparse computation within a small footprint that may be stacked, for example, below the imaging system 100. The time-to-digital converter 110 provides a timing sequence that allows for the time synchronization between the emitter 102 and the components of the block imager 120 to perform time-of-flight measurements.

The processor 106 is linked to emitter 102, receiver block 104, time-to-digital converter 110, and memory 108 by the interface 112. The processor 106 selectively toggles a subset of the detectors within the receiver block 104 in accordance with compressive sensing techniques. The selective sampling allows capturing the depth and intensity measurements based on a sample pattern that varies at predefined time intervals. The processor 106 generates a final image in accordance with the reconstructed depth and intensity information of the subset of the field-of-view received by the sampled subset of detectors.

The processor 106 may be any component or collection of components adapted to perform computations and/or other processing-related tasks. The memory 108 may be any component or collection of components adapted to store programming and/or instructions for execution of the processor 106. In an embodiment, memory 108 includes a non-transitory computer-readable medium. The imaging system 100 may include additional components not depicted in FIG. 1, such as long-term storage (e.g., non-volatile memory).

The processor 106 can be, for example, a microprocessor, a microcontroller, a control circuit, a digital signal processor, a field-programmable gate array (FPGA), an application-specific integrated circuit (ASIC), a system-on-chip (SoC), a graphics processing unit (GPU), or combinations thereof. The block imager 120 is shown to have a single processor; however, in some embodiments, multiple processors may be included, and the various functions herein attributed to the processor 106 may be distributed across these multiple processors. Further, in some embodiments, the processor 106 is that of a host device. In embodiments, the processor 106 computes an image 114 for the imaging system 100.

The memory 108 may be configured to store data, programs, firmware, operating systems, and other information and make the data, programs, firmware, operating systems, and additional information accessible to the processor 106. The memory 108 may include any type of non-transitory system memory such as static random access memory (SRAM), dynamic random access memory (DRAM), synchronous DRAM (SDRAM), read-only memory (ROM), or a combination thereof. In an embodiment, memory 108 may include ROM for use at boot-up, and DRAM for program, firmware, and data storage for use while executing programs. The memory 108 may include, for example, one or more of a solid-state drive, hard disk drive, a magnetic disk drive, a removable memory drive, or an optical disk drive. In some embodiments, the block imager 120 may utilize a host memory instead of the memory 108. In such an embodiment, the block imager 120 may not have a dedicated memory 108.

The interface 112 may be any component or collection of components that allow the processor 106 to communicate with other devices/components and/or a user. For example, interface 112 may be adapted to communicate data, control, or management messages from the processor 106 to applications installed on a host device and/or a remote device. As another example, interface 112 may be adapted to allow a user or user devices to interact/communicate with the imaging system 100.

The emitter 102 is configured to emit a signal to illuminate the scene. Each detector of the receiver block 104 is configured to measure the time-of-flight of the emitted signal reflected from the objects 106a-c within a respective subset of the field-of-view of the corresponding detector. The time-of-flight measurements are synchronized in accordance with a timing reference corresponding to the emission of the signal by the emitter 102. The objects 106a-c may be any type of physical objects within the field-of-view of the emitter 102.

In embodiments, each block can have an emitter 102 for long-range applications. In such embodiments, each block outputs a particular part of the final image, which simplifies read-out.

Embodiments of the present disclosure use direct time-of-flight, the accumulation of the counts of events, and a summation of the time-of-flight measurements associated with a pattern per the compressive sensing principle. These embodiments retain all detector events and advantageously utilize every single event and its associated time differential to the emitter 102—each photon's detected time-of-flight.

In embodiments, a receiver block 104 that includes a small-scale compressive sensing imaging block with p×p resolution is provided. In embodiments, the detector performs the compressive sensing sampling. In such an embodiment, a single laser light source provides uniform illumination within the field-of-view of the detector instead of using the conventional $p^2$ number of emitters 102 (i.e., laser sources). Compressive sensing can be distributed across small $p^2$ problems. Further, resource requirements in the imaging system 100 can be significantly reduced during image reconstruction using approximate computational techniques.

Although embodiments of this disclosure can utilize reduced precision scaling techniques to decrease resource requirements, other approximation techniques may also be used to achieve similar or more significant reductions.

In embodiments, multiple receiver blocks 104 can be combined to form larger imagers that operate at higher resolutions without additional emitters per block. In embodiments, flash illumination is permissible for short-range imaging. Further details on a scaled-up system are disclosed in FIG. 4.

Figure 2:
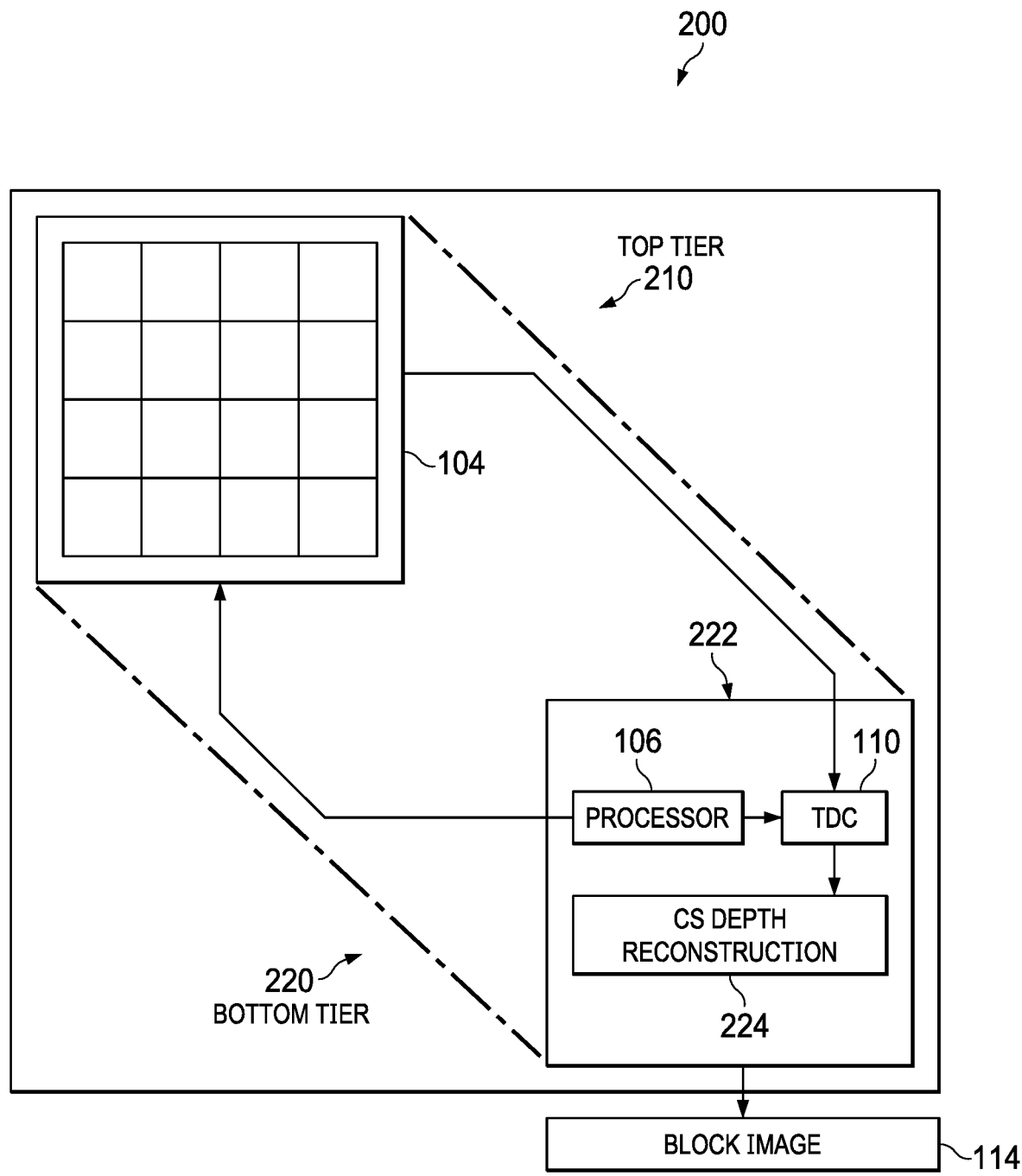
FIG. 2 is a block diagram of an embodiment block imager.

FIG. 2 illustrates a block diagram of an embodiment block imager 120. As shown, the building blocks of the block imager 120 include a compact stacked block having a top tier 210 and a bottom tier 220, which may (or may not) be arranged as shown in FIG. 2. The top tier 210 includes the receiver block 104. The bottom tier 220 includes an integrated logic unit 222. The integrated logic unit 222 includes the processor 106, a time-to-digital converter 110, and a depth reconstruction unit 224. The block imager 120 may include additional components not depicted in FIG. 2, such as a memory.

In embodiments, the bottom tier 220 is placed directly underneath the top tier 210 and approximately occupies the same space as the top tier 210 or less. In embodiments, a subset of the detectors in the receiver block 104 is selected by the processor 106. In some embodiments, selecting the subset of the detectors in the receiver block 104 is in accordance with a predefined pattern sequence. In embodiments, selecting the subset of the detectors in the receiver block 104 is random, as defined by a known pattern. The known pattern may be known by the system. The system may include multiple instances of known patterns, randomly selected or selected from a pre-generated sequence of patterns.

A subset of the associated pixels of the receiver block 104 is read-out, contributing to the depth and intensity measurements of the scene illuminated by the emitter 102. The processor 106 controls the detectors' selection, controls the detectors' read-out, and toggles the selected subset of detectors based on the predefined pattern sequence.

The output of the subset of detectors is sampled by the time-to-digital converter 110 to form a measurement vector. The time-to-digital converter 110 uses a synchronized signal providing timing of the emitter 102 by the processor 106. The integrated logic unit 222 reconstructs the depth and intensity image based on the data received from the subset of detectors and compressive sensing reconstruction techniques. An image 114 is provided as an output of the block imager 120. In embodiments, a depth reconstruction unit 224 reconstructs the image 114 corresponding to a depth and intensity image.

Generally, processor 106 can be used to control the activation of a detector, for pattern control, and timing requirements for the time-of-flight measurements. The depth reconstruction unit 224 may be used, in embodiments, for compressive sensing reconstruction. The depth reconstruction unit 224 can use the selected patterns, for example, by the processor 106, for the current measurement vector and the corresponding measurement vector to compute the depth and intensity of the image. In embodiments, the processor 106 controls the logic decisions in a system. In other embodiments, the logic decisions in the system are appropriated to other logic units. In yet other embodiments, the system's logic decisions may be shared between the processor 106 and other logic specific units.

Figure 3:
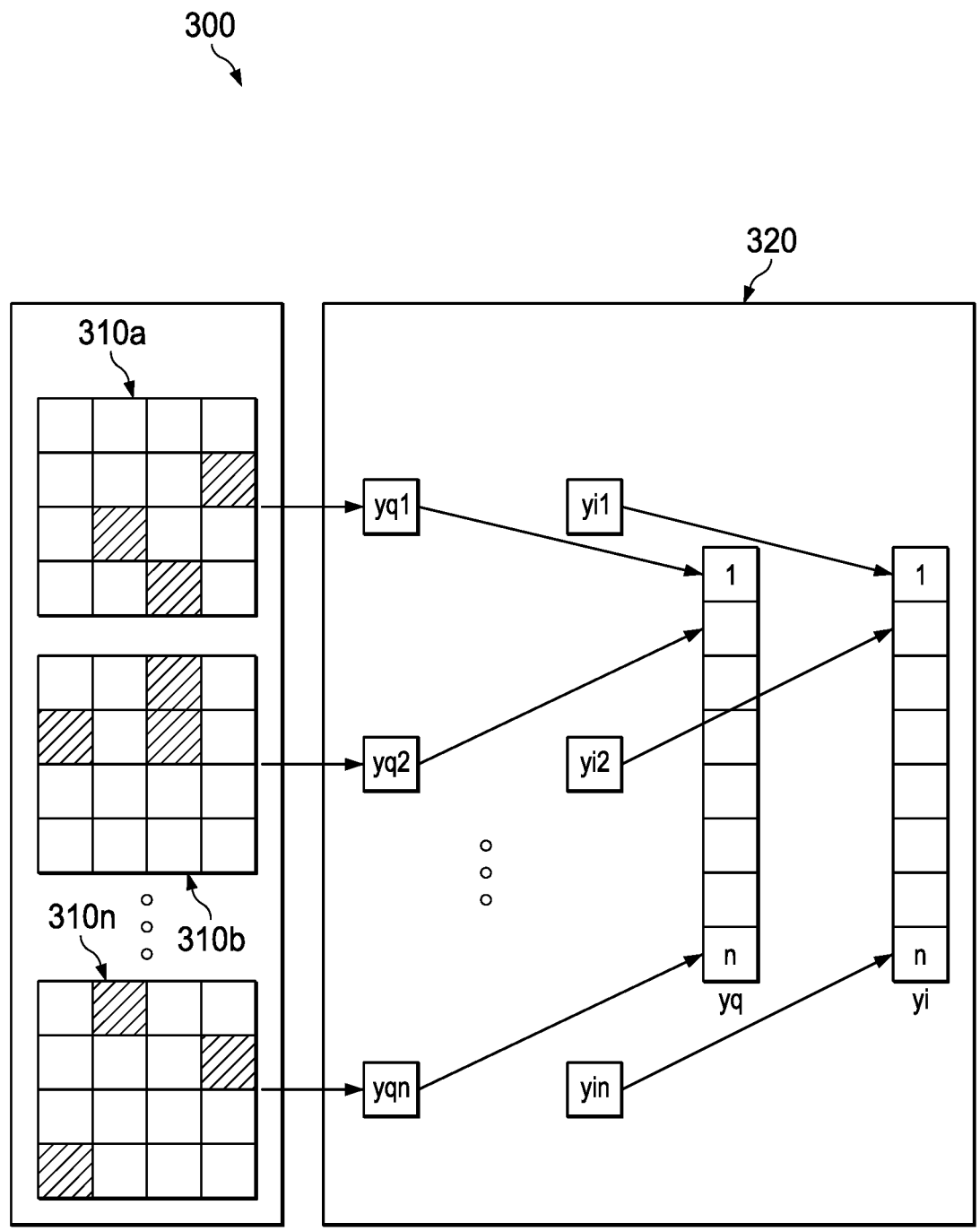
FIG. 3 is a block diagram of an embodiment sparse pattern control sequence.

FIG. 3 illustrates a block diagram of an embodiment sparse pattern control sequence 300, as may be used to select the subset of detectors in the receiver block 104. Implementing the sparse pattern control sequence 300 at the block imager 120 reduces the need for an elaborate multi-source emitter used in traditional compressive sensing imaging.

In compressive sensing, traditionally, light is spatially modulated (i.e., a projection $\varphi$ is applied, either at emission or before detection, using, for example, digital micro-mirror devices). Further, existing solutions that use compressive sensing at an emitter require complex illumination schemes with large laser arrays or a spatial light modulator (SLM), which negatively impacts the size and cost of the imaging system.

Generally, optical alignment is required to match an emitter with a detector to ensure pulse synchronization with the received photons in a pulse cycle. These systems require precise optical alignments and potentially tight tolerances in the optical unit. As these imaging systems require more than one emitter, the cost of these systems are more expensive than the proposed imaging system in the present disclosure.

The embodiments of this disclosure provide a more robust solution with regards to optical misalignment at the emitter 102. The embodiments disclosed provide a reconstruction of the image 114 using the block imager 120 without restraints at the emitter 102.

In embodiments, the emitter may be aligned for each block or a multitude of the blocks, for example, when flash emitting. However, in such embodiments, each laser diode does not need to be aligned with each detector. Thus, a greater amount of tolerance is provided in, for example, long-range LiDAR applications.

In embodiments, the sampling is contained at the receiver block 104 without physical light modulation at the emitter 102. The processor 106 is configured as a sparse pattern controller to mask the sampling of the subset of detectors in the receiver block 104 with, for example, Gaussian random binary patterns. In an embodiment, processor 106 directly toggles the subset of detectors in the receiver block 104. In some embodiments, processor 106 may be a dedicated sparse sampling controller circuit that controls the read-out at the receiver block 104.

In some embodiments, the processor 106 applies a mask to the time-to-digital converter 110. In such an embodiment, the subset of detectors in the receiver block 104 is sampled in accordance with a sparse pattern activation maps 310*a-n* stored, for example, in the memory 108 or the memory of a host device. As shown, each of the sparse activation maps 310*a-n* provides a different mapping of detectors within the receiver block 104 to be enabled when selected.

In the exemplary embodiment, sparse pattern activation maps 310*a-n*, 3 out of 16 detectors are shown to be activated during each time-of-flight measurement using compressive sensing. The exemplary embodiment is non-limiting, and any M number of selected detectors within an N total number of detectors in the receiver block 104, where M<N, may apply.

Processor 106 is in communication with, for example, memory 108 that stores the sparse pattern activation maps 310*a-n*. Processor 106 selects the subset of the detectors in accordance with a selected sparse pattern activation map 310*a-n*.

In some embodiments, the selection of one of the sparse activation maps 310*a-n* may be random. In such an embodiment, the activation map is generated at runtime. In some embodiments, the pattern sequence is pre-generated (i.e., known to the system). In such an embodiment, the pattern sequence is randomly drawn from the set of pre-generated pattern sequences such that no pattern is re-used in a measurement cycle. In some embodiments, the selection of one of the sparse pattern activation maps 310*a-n* may be based on some predefined sequence stored, for example, in the optional memory 308 or an off-chip memory in the host device.

In embodiments, the sparse pattern activation maps 310*a-n* provide a set of data that indicates which one of the detectors in the receiver block 104 are toggled ON or OFF for a respective time-of-flight measurement of the imaging system 100 based on compressive sensing techniques at the receiver block 104.

Each pattern in a sequence 310*a*-310*n* forms two cumulative measurements stored in their respective measurement vector index (1–n) of length n. The sequence order of pattern is known and stored for each measurement cycle to enable depth and image reconstruction via compressive sensing principles.

Figure 4:
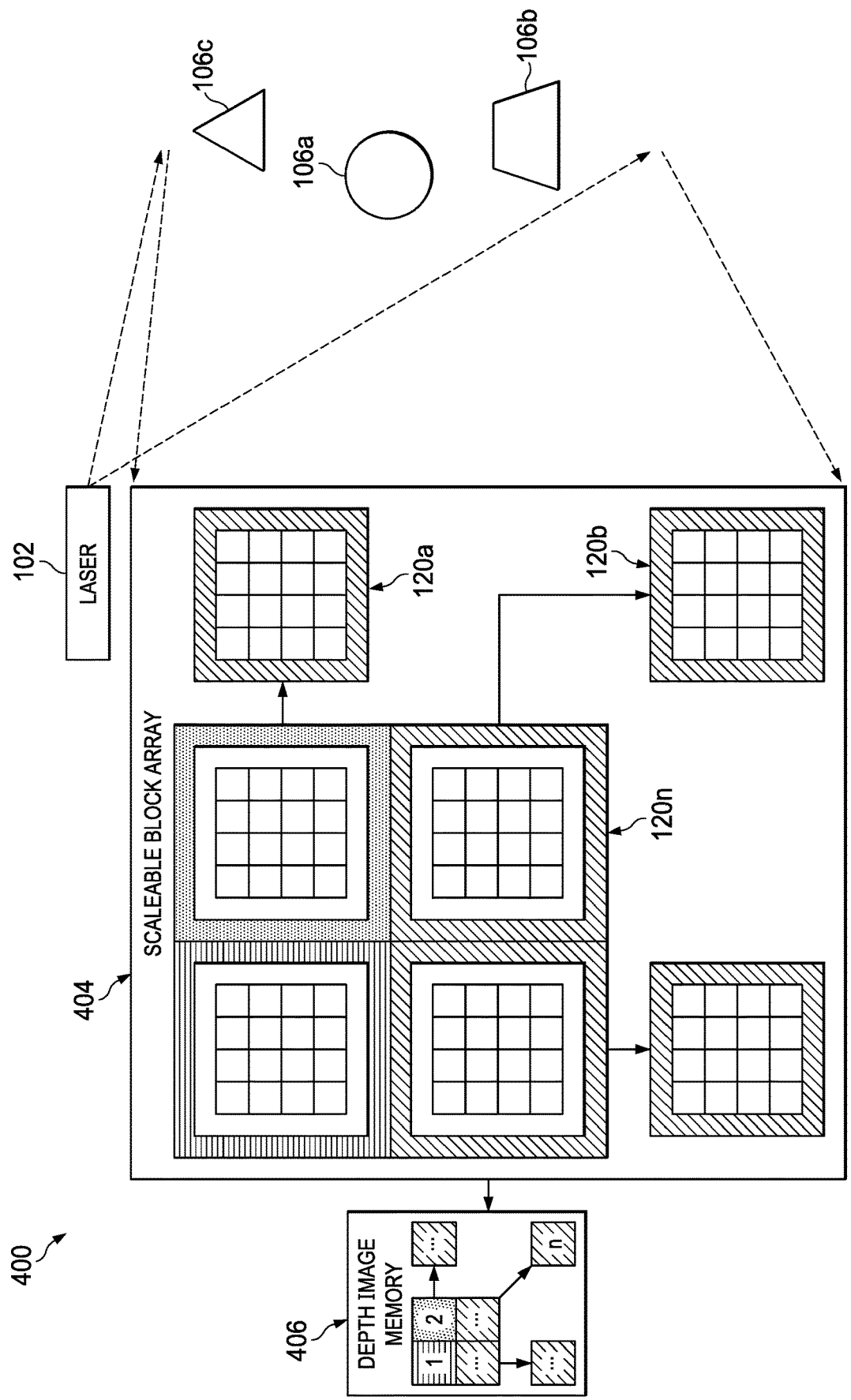
FIG. 4 is a block diagram of another embodiment imaging system.

FIG. 4 illustrates a block diagram of an embodiment imaging system 400, which may be installed in a host device. The imaging system 400 is similar to the imaging system 100. The imaging system 400, however, includes a scalable block array 404 that includes a plurality of block imagers 120*a-n*. In embodiments, each block imager 120*a-n* has similar components and functions similarly to the block imager 120 in FIG. 1. The advantages ascribed to the imaging system 100 similarly apply to the imaging system 400, for example, in high-resolution depth imaging. Similar to the imaging system 100, the imaging system 400 includes an emitter 102 that includes a single source of illumination—no additional emitters are required. In embodiments, the final output of the imaging system 400 is a depth image and an intensity image stored in a final container within the memory 406. In embodiments, memory 406 is a memory of the host device containing the imaging system 400.

In the imaging system 400, each block imager 120*a-n* operates independently from the other block imagers 120*a-n*. Each block imager 120*a-n* can independently be read-out to perform similar operations in sequence or parallel by a respective processor 106 of each block imager 120*a-n*. In embodiments, the operation of the respective processors 106 may be performed using a dedicated processor in, for example, a host device. The dedicated processor may be stacked or off-chip to the imaging system 400.

In embodiments, each block imager 120*a-n* may have a dedicated processor 106, for example, an ASIC stacked behind the sensing area to independently provide the depth and intensity image output for the respective block imager 120*a-n*. In the imaging system 400, the output of each block imager 120 may be placed in a final image container in, for example, the host device memory in accordance with the number and arrangement of block imagers 120a-n in the imaging system 400. As the depth value per pixel and an optional intensity value are transferred from each block imager 120a-n, the number of interfaces is less than that of an RGB imager.

As each block imager 120a-n operates independently, no significant communication is necessary between the block imagers 120a-n to reconstruct the full image. Further, the independence of the block imagers 120a-n allows for the processing time to reconstruct the full image on a per receiver block 104 basis instead of a multiplier of the block imagers 120a-n. Thus, when the number of the block imagers 120a-n is increased, the processing time and thus the framerate of the scalable array remain constant at all sizes.

In embodiments, approximations within the processing chain may be used to reduce the size of the processing chain within each self-contained block imager 120a-n. In embodiments, the final image stored within the memory block of memory 108 may be hardwired. In other words, as each block has an allocated memory to store the respective block image, each block can dump the output without a great deal of logic required. It is noted that some logic may be desirable to ensure, for example, a full-frame refresh.

In embodiments, the frame rate of the imaging system 400 may have a value greater than 500 Hertz (Hz) per block imager 120a-n in sampling and reconstruction. As the number of block imagers 120a-n is increased, the frame rate of the imaging system 400 remains constant. In other words, the system frame rate is defined by the complexity of the block imager 120a-n and not the number of block imagers 120a-n. Further, the memory requirements in the imaging system 400 is reduced when compared to a full histogram per pixel computation imaging system.

Figure 5:
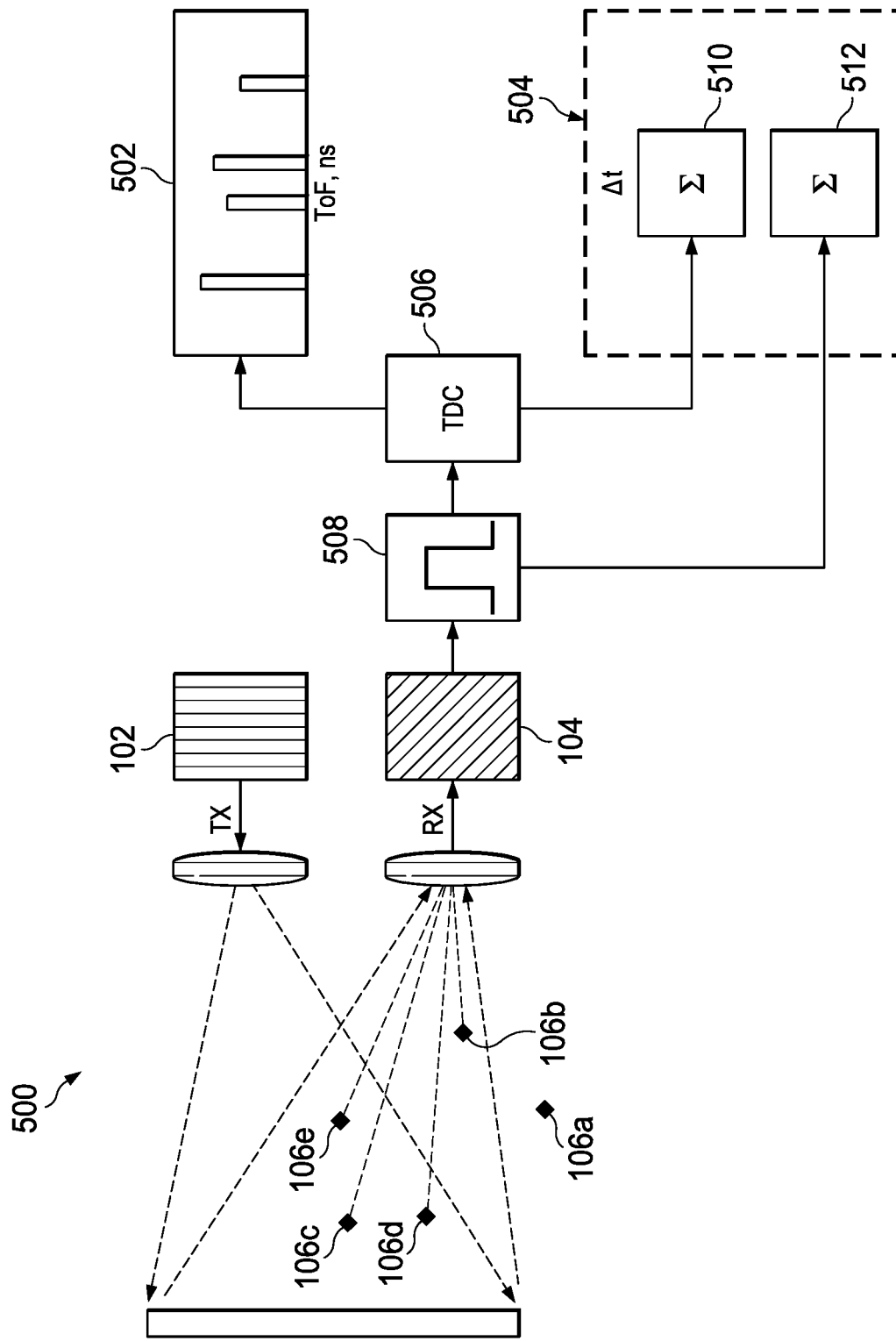
FIG. 5 is a block diagram of yet another embodiment imaging system.

FIG. 5 illustrates a block diagram of an imaging system 500 capable of both a full histogram time-to-digital conversion and compressive time-to-digital conversion measurements. The histogram logic circuit 502 provides the histogram time-to-digital conversion, and the compressive sensing circuit 504 provides the compressive measurement time-to-digital conversion. As shown, the imaging system 500 includes the emitter 102 and a receiver block 104. In embodiments, the receiver block 104 may include one or more of block imagers 120a-n.

In FIG. 5, a photon event 508 is shown at a particular time. The photon event 508, through the time-to-digital converter 506, is converted to a time-stamp and is counted in the photon counter 512. A summer 510 sums up each time-of-flight measurement as previously disclosed herein without an initial use of a histogram. As such, a sampling path is provided without the need for histogram sampling.

In an embodiment, the compressive sensing foregoes the histogram $h \in N^L$ as a sampling container, where L is the number of bins or time steps. In compressive sensing, all events associated with a sparse projection are summed for singular intensity measurement per event. As a result, advantageously, the requisite memory to store depth and intensity information is significantly reduced from a large histogram per pixel to two counters per imaging block with multiple pixels.

As a matter of example, in a 4×4 block imager 120, having a range of 5 meters (m) and a bin resolution of 1 centimeter, the size of the histogram, in the histogram logic circuit 502, is $h \in N^{500}$. A corresponding histogram memory map, in the traditional histogram sampling methodology, would require memory storage with the size of $M \in N^{16 \times 500 \times 16}$, assuming 16-bit precision—a 16 kilobyte (kB) memory size requirement. The size of the raw histogram data in a system having a resolution corresponding to the video graphics array (VGA) interface standard is 30 megabytes (MB). As the range and bin resolution are increased, the size of the memory requirement grows dramatically.

In an embodiment, the size of the final memory map is $M_{CS} \in N^{2 \times 16}$, assuming the same bit precision for the 4×4 block imager 120. The size of the raw sampling data per patter sequence of eight patterns in a system having a resolution corresponding to the VGA interface standard is 614.4 kB.

The histogram logic circuit 502 provides pixel-based sampling, and the compressive sensing circuit 504 provides compressive sensing, sparse based sampling. The histogram logic circuit 502 allows for noise removal prior to time-of-flight measurements through, for example, thresholding. In other words, the measurements per $k^{th}$ pattern are $(yI) = \Sigma(h)k$ and $(yQ)k = \Sigma((h)k \cdot d)$, where $d \in RL$ is the discrete depth vector encoding each bin distance according to the time-of-flight principle. A single histogram logic circuit 502 for each block imager 120 is sufficient for this purpose.

The emitter 102 emits a signal using a light source that uniformly illuminates the field-of-view of the emitter 102. The receiver block 104 captures the reflected light from each of the objects 106a-e physically located within the field of view of the emitter 102. In embodiments, the imaging system 500 includes one time-to-digital converter 506 to provide a time-differential concerning the emitter 102.

Figure 6:
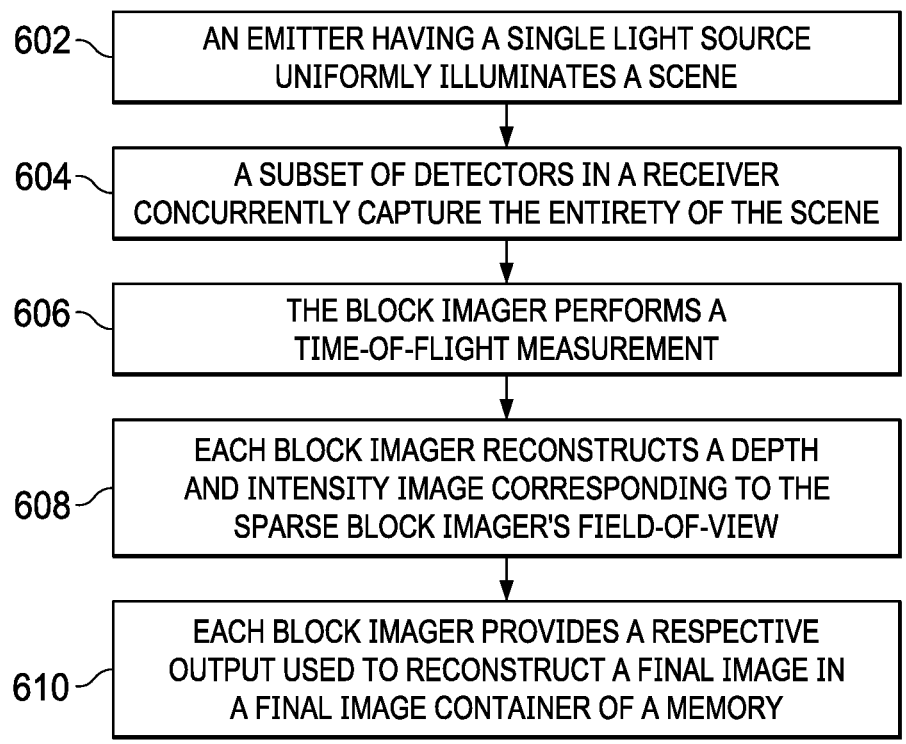
FIG. 6 is a flowchart of an embodiment method for operating an imaging system.

FIG. 6 illustrates a flowchart of an embodiment method 600 for operating an imaging system, as may be performed in the embodiments of this disclosure. At step 602, an emitter having a single coherent point source uniformly illuminates a scene. The point source has a system specified field-of-view. At step 604, a subset of detectors in a receiver of a block imager concurrently captures the entirety of the scene. In embodiments, the imaging system may include multiple block imagers, and each block imager may capture a subset of the entirety of the scene. In embodiments, each detector in a respective receiver block captures a subset of the field of view through sampling M measurements using M sparse patterns.

At step 606, each block imager performs time-of-flight with reference to the timing of the single coherent point source using a time-to-digital converter. At step 608, each block imager reconstructs a depth and intensity image corresponding to the block imager's field-of-view. At step 610, each block imager provides a respective output used to reconstruct a final image in a final image container of memory. The final image container provides a large scale image.

It is noted that the order of steps shown in FIG. 9 is not absolutely required, so in principle, the various steps may be performed out of the illustrated order. Also, certain steps may be skipped, different steps may be added or substituted, or selected steps or groups of steps may be performed in a separate application.

In the present description, when reference is made to terms qualifying absolute positions, such as terms "front," "back," "top," "bottom," "left," "right," etc., or relative positions, such as terms "above," "under," "upper," "lower," etc., or to terms qualifying directions, such as terms "horizontal," "vertical," etc., it is referred to the orientation of the drawings.

Unless otherwise specified, when reference is made to two elements electrically connected together, this means that the elements are directly connected with no intermediate element other than conductors. When reference is made to two elements electrically coupled together, this means that the two elements may be directly coupled (connected) or coupled via one or a plurality of other elements.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method comprising:
   uniformly illuminating a scene within a field-of-view of an emitter;
   having a receiver comprising a plurality of detectors;
   selectively sampling a subset of the plurality of detectors in accordance with compressive sensing techniques;
   capturing depth and intensity measurements by each of the subset of the plurality of detectors, each detector capturing depth and intensity information corresponding to a subset of the field-of-view; and
   generating, by a processor, images of the scene in accordance with an output from the subset of the plurality of the detectors, the images providing a depth and intensity image corresponding to the field-of-view of the emitter.

2. The method of claim 1, wherein the emitter comprises a single light source.

3. The method of claim 1, wherein the emitter comprises a coherent light source comprising a plurality of light sources, the plurality of light sources providing a single uniform illumination of the scene.

4. The method of claim 1, further comprising communicating, by each of the subset of the plurality of detectors, a respective depth and intensity measurement to the processor.

5. The method of claim 1, wherein the receiver is an array comprising a plurality of single-photon avalanche diode (SPAD) devices, wherein each SPAD device corresponds to a detector in the plurality of detectors.

6. The method of claim 1, further comprising:
   emitting a signal to illuminate the scene; and
   measuring, each of the subset of the plurality of detectors, a time-of-flight (ToF) of the signal within a respective subset of a field-of-view of each detector, the measurement synchronized in accordance to a timing reference corresponding to the emission of the signal.

7. The method of claim 1, wherein capturing the depth and the intensity measurements by each of the subset of the plurality of detectors comprises reconstructing the depth and intensity image within the subset of the field-of-view.

8. The method of claim 7, further comprising providing an output of the reconstructed depth and intensity measurements within the subset of the field-of-view to the processor.

9. The method of claim 1, wherein selectively sampling the subset of the plurality of detectors in accordance with compressive sensing techniques comprises selectively toggling each of the subset of the plurality of detectors in accordance with a pattern that changes at predefined time intervals.

10. A device comprising:
    an emitter configured to uniformly illuminate a scene within a field-of-view of the emitter;
    a receiver comprising a plurality of detectors, each detector configured to capture depth and intensity information corresponding to a subset of the field-of-view; and
    a processor coupled to the detector, the processor configured to:
       selectively sample a subset of the plurality of the detectors in accordance with compressive sensing techniques, and
       provide an image in accordance with an output from the subset of the plurality of the detectors, the image providing a depth and intensity image corresponding to the field-of-view of the emitter.

11. The device of claim 10, further comprising a plurality of communication links, each communication link coupling a respective detector to the processor.

12. The device of claim 10, wherein the receiver is an array comprising a plurality of single-photon avalanche diode (SPAD) devices, wherein each SPAD device corresponds to a detector in the plurality of detectors.

13. The device of claim 10, wherein the emitter is configured to emit a signal to illuminate the scene, wherein each detector is configured to measure a time-of-flight (ToF) of the signal within a respective subset of the field-of-view of the detector, the measurement synchronized in accordance to a timing reference corresponding to the emission of the signal.

14. The device of claim 10, wherein each detector configured to capture the depth and intensity information corresponding to a subset of the field-of-view comprises reconstructing the depth and intensity image within the subset of the field-of-view.

15. The device of claim 14, wherein each receiver is further configured to output the reconstructed depth and intensity image within the subset of the field-of-view to the processor.

16. The device of claim 10, wherein selectively sampling the subset of the plurality of detectors in accordance with compressive sensing techniques comprises selectively toggling the subset of the plurality of the detectors in accordance with a pattern that changes at predefined time intervals.

17. The device of claim 10, wherein the emitter comprises a single light source.

18. The device of claim 10, wherein the emitter comprises a coherent light source comprising a plurality of light sources, the plurality of light sources providing a single uniform illumination of the scene.

19. A system comprising:
    an emitter configured to uniformly illuminate a scene within a field-of-view of the emitter; and
    an imager comprising:
       a plurality of receivers, each receiver comprising a plurality of detectors, each detector configured to capture depth and intensity information corresponding to a subset of the field-of-view based on a reflection from the emitter, a plurality of processors, each processor coupled to a respective receiver, each processor configured to:
selectively sample a subset of the plurality of the detectors in accordance with compressive sensing techniques; and
provide a corresponding image in accordance with an output from the subset of the plurality of the detectors, the image providing a depth and intensity image corresponding to the field-of-view of the emitter, and a memory coupled to the processor, the memory used to store each of the images in accordance with a configuration of each respective receiver, the plurality of images providing a final full image corresponding to an image of the scene.

20. The system of claim 19, wherein each imager comprises a plurality of communication links, each communication link coupling a respective detector to a corresponding processor.

21. The system of claim 19, wherein each receiver is an array comprising a plurality of single-photon avalanche diode (SPAD) devices, wherein each SPAD device corresponds to a respective detector in a plurality of detectors.

22. The system of claim 19, wherein the emitter is configured to emit a signal to illuminate the scene, wherein each detector is configured to measure a time-of-flight (ToF) of the signal within a respective subset of the field-of-view of the detector, the measurement synchronized in accordance to a timing reference corresponding to the emission of the signal.

23. The system of claim 19, wherein each detector configured to capture a depth and intensity image corresponding to a subset of the field-of-view comprises reconstructing the depth and intensity image within the subset of the field-of-view.

24. The system of claim 19, wherein selectively sampling the subset of the plurality of detectors in accordance with compressive sensing techniques comprises selectively toggling the subset of the plurality of the detectors in accordance with a pattern that changes at predefined time intervals.

25. The system of claim 19, wherein the emitter comprises a single light source.

26. The system of claim 19, wherein the emitter comprises a coherent light source comprising a plurality of light sources, the plurality of light sources providing a single uniform illumination of the scene.

* * * * *